United States Patent
Stager et al.

(10) Patent No.: US 10,285,148 B2
(45) Date of Patent: May 7, 2019

(54) SYNCHRONIZED WIRELESS SIGNAL TRANSMISSION BY ENDPOINTS CONTROLLED BY A CENTRAL CONTROLLER

(71) Applicant: Cisco Technology, Inc., San Jose, CA (US)

(72) Inventors: Paul J. Stager, Akron, OH (US); David S. Kloper, Santa Clara, CA (US); Brian D. Hart, Sunnyvale, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/582,024

(22) Filed: Apr. 28, 2017

(65) Prior Publication Data

US 2018/0317188 A1 Nov. 1, 2018

(51) Int. Cl.
*H04W 56/00* (2009.01)

(52) U.S. Cl.
CPC .............. *H04W 56/0015* (2013.01)

(58) Field of Classification Search
CPC .................................. H04W 56/0015
See application file for complete search history.

(56) References Cited

U.S. PATENT DOCUMENTS

| | | | |
|---|---|---|---|
| 6,275,518 B1 * | 8/2001 | Takahashi | H04B 1/715 370/321 |
| 6,665,316 B1 * | 12/2003 | Eidson | G06F 1/14 370/509 |
| 7,046,718 B1 * | 5/2006 | Yung | H03J 1/00 375/145 |
| 7,103,072 B1 | 9/2006 | Sloan et al. | |
| 8,514,995 B1 | 8/2013 | Oh et al. | |
| 2002/0075980 A1 | 6/2002 | Tang et al. | |
| 2015/0277481 A1 * | 10/2015 | Manabe | G06F 1/12 713/501 |

(Continued)

OTHER PUBLICATIONS

Jie Wu, Yichao Ma, Jie Zhang, and Mingpu Xie; "A Low-Jitter Synchronous Clock Distribution Scheme Using a DAC Based PLL." IEEE Transactions on Nuclear Science, vol. 57, No. 2, Apr. 2010; <http://ieeexplore.ieee.org/document/5446508/>.

*Primary Examiner* — Phuc H Tran
(74) *Attorney, Agent, or Firm* — Patterson + Sheridan, LLP

(57) ABSTRACT

Techniques are disclosed to synchronize wireless signal transmission by endpoints controlled by a central controller. For example, an example method of wireless communication includes receiving, at a first device, over a wired medium between the first device and a second device, a plurality of packets from the second device. Each of the plurality of packets comprises data representative of a portion of a signal corresponding to a wireless medium. The method further includes receiving, at the first device, from the second device over the wired medium a synchronization signal based on a common master clock at the second device. The method further includes synchronizing, at the first device, a local clock of the first device to the common master clock based on the synchronization signal. The method further includes reconstructing the signal corresponding to the wireless medium based on the plurality of packets and the synchronized local clock.

17 Claims, 6 Drawing Sheets

(56) References Cited

U.S. PATENT DOCUMENTS

2016/0057186 A1* 2/2016 Jose ................. H04L 45/02
370/312
2017/0041357 A1* 2/2017 Wang ............... H04L 43/0852

* cited by examiner

(12) United States Patent
US 10,285,148 B2

SYNCHRONIZED WIRELESS SIGNAL TRANSMISSION BY ENDPOINTS CONTROLLED BY A CENTRAL CONTROLLER

TECHNICAL FIELD

Embodiments of the invention generally relate to techniques for synchronizing transmission of a wireless signal by multiple endpoints controlled by a common controller. More specifically, embodiments presented herein are directed to reconstructing a waveform for wireless transmission by an endpoint based on samples of the waveform received over a wired medium from a common physical point, the reconstruction being based on a local clock of the endpoint synchronized to a master clock at the common physical point.

BACKGROUND

Applications such as Time Difference of Arrival (TDOA) or Time of Arrival (TOA) methods for location determination rely on tight synchronization of the clocks of a plurality of devices such as access points. For example, with TDOA, for every nanosecond of uncertainty between access point (AP) clocks there is a foot of uncertainty in the spatial solution. AP clocks, for example, are naturally unsynchronized because of slight differences in the quartz crystals used to set clock frequencies. In addition, clock variations may occur due to temperature, age, and clock jitter. Further, applications such as beam-forming and multi-user multiple-input multiple-output MIMO (MU-MIMO) apply pre-coding to baseband signals which may rely on precise phase and frequency coherence across all signal paths. In addition these applications may require the tight synchronization of transmission of the same wireless signal from multiple APs in a network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
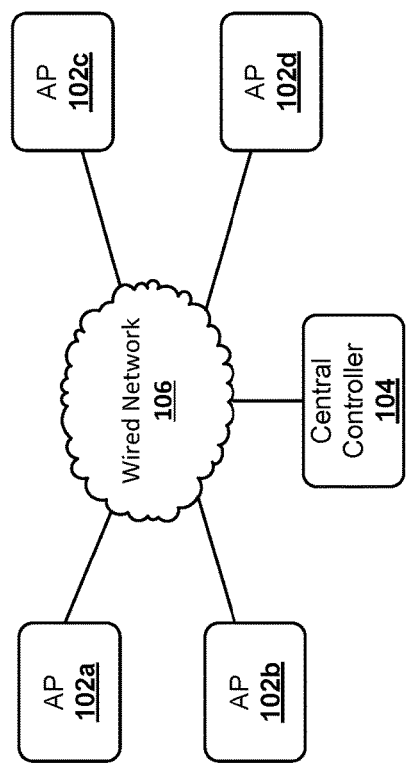
FIG. 1 is a block diagram illustrating an example of a wireless network, according to one embodiment.

One embodiment presented herein provides a method of wireless communication including receiving, at a first device, over a wired medium between the first device and a second device, a plurality of packets from the second device. Each of the plurality of packets comprises data representative of a portion of a signal corresponding to a wireless medium. The method further includes receiving, at the first device, from the second device over the wired medium a synchronization signal based on a common master clock at the second device. The method further includes synchronizing, at the first device, a local clock of the first device to the common master clock based on the synchronization signal. The method further includes reconstructing the signal corresponding to the wireless medium based on the plurality of packets and the synchronized local clock.

Another embodiment presented herein provides a first device for wireless communication including an interface, a control loop, and a processor. The interface is configured to receive over a wired medium between the first device and a second device, a plurality of packets from the second device. Each of the plurality of packets comprises data representative of a portion of a signal corresponding to a wireless medium. The interface is further configured to receive from the second device over the wired medium a synchronization signal based on a common master clock at the second device. The control loop is configured to synchronize a local clock of the first device to the common master clock based on the synchronization signal. The processor is configured to reconstruct the signal corresponding to the wireless medium based on the plurality of packets and the synchronized local clock.

Another embodiment presented herein provides a first device for wireless communication including means for receiving, over a wired medium between the first device and a second device, a plurality of packets from the second device. Each of the plurality of packets comprises data representative of a portion of a signal corresponding to a wireless medium. The first device further includes means for receiving from the second device over the wired medium a synchronization signal based on a common master clock at the second device. The first device further includes means for synchronizing a local clock of the first device to the common master clock based on the synchronization signal. The first device further includes means for reconstructing the signal corresponding to the wireless medium based on the plurality of packets and the synchronized local clock.

Another embodiment presented herein provides a non-transitory computer-readable medium comprising instructions that when executed by a first device causes the first device to perform a method. The method includes receiving, at a first device, over a wired medium between the first device and a second device, a plurality of packets from the second device. Each of the plurality of packets comprises data representative of a portion of a signal corresponding to a wireless medium. The method further includes receiving, at the first device, from the second device over the wired medium a synchronization signal based on a common master clock at the second device. The method further includes synchronizing, at the first device, a local clock of the first device to the common master clock based on the synchronization signal. The method further includes reconstructing the signal corresponding to the wireless medium based on the plurality of packets and the synchronized local clock.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Embodiments presented herein provide techniques to synchronize transmission of a wireless signal by multiple access points (e.g., APs) in a wireless network. For example, multiple APs may be part of a distributed network architecture. The multiple APs may be controlled by a common or central controller. For example, the multiple APs may be coupled by a wired medium (e.g., fiber, coax, copper, etc.) to the central controller. In some embodiments, the central controller generates discrete samples (e.g., discrete-time baseband samples) of a continuous-time signal (e.g., waveform) for synchronized wireless transmission by the multiple APs. The spacing between samples is determined with respect to a master clock (e.g., sampled at a rate according to the master clock) at the central controller, and the central controller packetizes the samples corresponding to a discrete signal into a plurality of packets (e.g., any suitable packet structure, such as, an Ethernet frame or an Ethernet-like frame with a truncated header). For example, one or more samples of the discrete signal may be segmented into each packet. Accordingly, each packet includes data corresponding to the one or more samples of the discrete signal. The data may be the one or more samples themselves or data representative of the one or more samples that can be used to generate the one or more samples such as chips, code division multiple access (CDMA) patterns, orthogonal frequency-division multiple access (OFDMA) data without a cyclic prefix, OFDMA frequency-domain data, etc. The central controller may further prepend a preamble to (e.g., header including information such as a destination address, source address, etc. for the packet)) and insert control information into the packet for transport over the wired medium. The central controller then sends the plurality of packets to each of the APs over the wired medium.

Each of the APs receives the plurality of packets including the data indicative of the samples corresponding to the discrete signal. Based on the data, the APs generate (e.g., generate based on the data, extract the data corresponding to the samples directly, etc.) the samples corresponding to the discrete signal. The APs then reconstruct the discrete signal based on the received samples using digital signal processing techniques and analog components such as digital filtering, mixing, digital-to-analog converters and analog low pass (or bandpass) filters. In order to reconstruct the discrete signal, the APs may need to align the received samples to the master clock at the central controller used to sample the discrete signal. Accordingly, in some embodiments, the central controller transmits a synchronization signal (e.g., a physical layer (PHY) signal such as used in synchronous Ethernet (SyncE)) based on the master clock over the wired medium to each of the plurality of APs. The APs may then recover a clock signal based on the received synchronization signal. The recovered clock, accordingly, has a relatively fixed phase and frequency relationship to the master clock.

In some embodiments, each of the APs utilizes the recovered clock signal generated at each AP that is synchronized to the master clock as a local clock to reconstruct the desired signal (e.g., continuous waveform) whose samples were generated at the central controller and wirelessly transmits the continuous waveform at a synchronized time (as each of the other APs) based on the recovered clock signal. For example, in some embodiments, each of the APs may use the local clock to drive their digital-to-analog converters (DACs) and radio frequency (RF) local oscillators. The APs then may reconstruct the desired signal and wirelessly transmit the reconstructed signal. The APs may synchronize the transmission of the reconstructed signal to a specific transmission time interval based on the recovered clocks synchronized to the master clock.

In some cases, the transmissions over the wired medium may be packet (e.g., frame) based transmissions, as discussed. The transmission of packets over the wired medium may be highly irregular with intermittent or varying time intervals between packets received by the APs. Further, the packet data received by the APs may have changing modulation and encoding schemes for different packets. In addition, there may be noise in the received signals from transmission over the wired medium. Accordingly, the recovered clock signal generated at each AP based on the synchronization signal received from the central controller over the wired medium may be a noisy representation of the original master clock at the central controller.

Accordingly, in some embodiments, each of the APs further generates another local clock based on the recovered clock signal that reduces the noise of the recovered clock. In some embodiments, the APs each include a local oscillator (e.g., voltage controlled oscillator (VCO), voltage controlled crystal oscillator (VCXO), numerically controlled oscillator (NCO), etc.) with a controllable oscillation frequency. The phase and frequency of the local oscillator is locked to the phase and frequency of the recovered clock and is used as the local clock. For example, in some embodiments, a slow control loop (e.g., fractional-N phase locked loop (PLL)) is used to adjust the phase and frequency of the local oscillator to the phase and frequency of the recovered clock. The slow control loop may include a feedback loop from the output of the local oscillator that is input into a comparator along with the recovered clock signal. The error between the phase and frequency of the recovered clock signal and the feedback based on the output of the local oscillator may be used to adjust the phase and frequency of the local oscillator to align with the phase and frequency of the recovered clock signal. The use of a slow control loop (e.g., with a sufficiently narrow bandwidth) helps to reduce the impact of noise and variations in the wired medium transport in the recovered signal on the generated local clock signal. In particular, short noise variations may be filtered out by the slow control loop.

In some embodiments, instead of digitally resampling the samples based on the recovered clock as the local clock, each of the APs further utilizes the local clock based on the local oscillator locked to the phase and frequency of the recovered clock to align the received samples and enable the reconstruction of the desired signal. For example, in some embodiments, at each AP, the AP generates from the plurality of packets and stores the discrete signal samples received from the central controller into a storage (e.g., a queue, a buffer, a first-in-first-out (FIFO) buffer, etc.). In some embodiments, the discrete signal samples are input into the storage asynchronously with the master clock at the central controller. For example, the discrete signal samples may be input into the storage based on a local oscillator (e.g., local free running oscillator not synchronized with the master clock at the central controller). The AP then pulls the discrete signal samples from the storage at a rate based on the local clock synchronized to the master clock, and delivers them, for example after some further digital signal processing, to the DACs which are also clocked via the local clock synchronized to the master clock, thereby aligning the samples to the master clock. For example, the DACs of the AP (and similarly the analog-to-digital converters (ADCs) of the AP) may be resampled to match the frequency of the master clock (e.g., based on the synchronization signal) or local clock synchronized to the master clock, and further de-rotated to correct for carrier frequency offsets. Via analog filters and RF local oscillators driven by the local clock synchronized to the master clock, the AP then may reconstruct the desired signal and wirelessly transmit the reconstructed signal. The APs may synchronize the transmission of the reconstructed signal to a specific transmission time interval based on the recovered clocks synchronized to the master clock.

In some embodiments, though the recovered clock is used to phase and frequency lock the local oscillator to generate a local clock, the discussed variations in the wired medium or other factors may make the exact phase relationship between each of the APs in the wireless network unknown. For example, the wired medium may affect the phase differently for each AP, as the packets travel a different path to each AP. In some embodiments, the phase relationship between each AP may remain fixed, but the actual offset (phase) is not known based on the packets transmitted through the wireless medium from the central controller to each AP. Accordingly, in some embodiments, the APs may further exchange wireless signals between each other to determine the actual offset between the APs. The APs may further adjust the local clock based on the determined actual offset between the APs. In other embodiments, the central controller may characterize the delays between APs as a function of frequency and perform pure frequency-domain offset correction or a mix of bulk time-domain correction and smaller frequency-domain offset refinement at the central controller so that signals reconstructed by the APs are all tightly synchronized. Obtaining the actual offset between APs may be useful for techniques such as beamforming, beamsteering, null steering, etc. over a wireless medium.

In some embodiments, besides using the local clock based on the recovered clock to pull discrete signal samples from storage to align the received samples and enable reconstruction of the desired signal, the local clock based on the recovered clock is used by the AP to derive clocks for other components of the AP. For example, in some embodiments, the AP includes one or more components to perform one or more of digital signal processing, signal sampling (e.g., converters), frequency translation (e.g., analog baseband to/from RF), etc. The clocks for performing these functions may also be derived from/based on the recovered clock so as to be phase/frequency locked with the master clock at the central controller. For example, the DACs of the AP (and similarly the analog-to-digital converters (ADCs) of the AP) may be resembled to match the frequency of the recovered clock or local clock synchronized to the master clock, and further de-rotated to correct for carrier frequency offsets.

In some embodiments, such as where beamforming is performed by multiple APs controlled by a central controller, the local clock synchronized to the master clock may be used to send a signal received at each of the APs to the central controller for synchronized processing. For example, multiple APs may receive beamformed signals corresponding to data and need to transmit samples of the signals to the central controller, similar to as described with respect to the central controller generating discrete samples of a continuous-time signal and sending them to multiple APs for synchronized wireless transmission by the multiple APs, but in reverse. Accordingly, techniques described herein as being performed by the central controller to generate discrete samples and send them to the APs, may be performed by the APs to generate discrete samples and send them to the central controller. Further, techniques described herein as being performed by the APs for reconstructing a desired signal, etc., may be performed by the central controller.

For example, for each AP, a local clock may be utilized to drive an ADC of the AP to convert the received analog signal to a digital representation of the signal including discrete samples of the analog signal. The local clock of each AP may be synchronized to the master clock of the central controller as described herein. The AP packetizes the samples corresponding to the digital representation of the signal into a plurality of packets such as described with respect to the central controller. The spacing between samples is determined with respect to the local clock at the AP. The AP packetizes the samples into a plurality of packets such as discussed with respect to the central controller. The AP may prepend a preamble to the packets such as discussed with respect to the central controller.

The central controller receives the packets including the data indicative of the samples corresponding to the digital representation of the signal. Based on the data, the central controller generates the samples corresponding to the discrete signal, such as discussed with respect to the AP. The central controller then reconstructs the discrete signal based on the received samples using digital signal processing techniques and analog components such as digital filtering, mixing, digital-to-analog converters and analog low pass (or bandpass) filters, such as discussed with respect to the AP. Further, the central controller may align the samples to the local clock at the AP, such as by using the master clock synchronized to the local clock, such as discussed with respect to the AP.

In some embodiments, the central controller utilizes the master clock to reconstruct the desired signals (e.g., analog signals) whose samples were generated at the APs. The central controller may then reconstruct the beamformed signal and process the signal to retrieve the data from the signal. In some embodiments, different components of the central controller may be driven by the master clock.

Accordingly, clock synchronization over a wired medium is advantageously utilized to synchronize the reconstruction and transmission of wireless signals at multiple APs. Certain advantages of the embodiments described herein include the heavy computing for wireless signal generation and packet processing to be performed at the central controller, thereby reducing the processing required at the multiple APs. Accordingly, the cost of the APs, of which there are multiple in the network, may be reduced, in favor of a higher cost central controller of which there is only one, thereby lowering the overall costs for implementing the network.

FIG. 1 is a block diagram illustrating an example of a wireless network 100. For purposes of the example being described herein, four access points (APs) 102a-102d (which can also be referred to as radio heads) are illustrated although those skilled in the art should readily appreciate that the principles described herein are applicable to any network with any physically realizable number of wireless endpoints such as access points. APs 102a-102d are coupled by a wired medium, shown as wired network 106, to a central controller 104. The wired network 106 may be any suitable wired networking topology using a suitable wired medium (e.g., fiber, coax, copper, etc.) to couple devices (e.g., APs 102a-102d and central controller 104) and allow data exchange between the devices.

In some embodiments, the wired network 106 supports packet based (e.g., frame based) communications such as Ethernet based communications. In some embodiments, the packets communicated over the wired network 106 between the APs 102a-102d and the central controller 104 conform to a standard, such as, IEEE 802.3. The packets may include a preamble or header (e.g., including a destination address and source address for routing the packet, such as, media access control (MAC) addresses of a source device and a destination device for the packets). The packets may further include a payload, as further discussed herein.

In some embodiments, the wired network 106 supports a synchronization mechanism for synchronizing clocks between devices in the wired network 106 based on signals exchanged between the devices over the wired network 106. In some embodiments, the synchronization mechanism includes exchanging physical layer (PHY) signals between devices in the wired network 106. For example, the wired network 106 may support SyncE.

In some embodiments, each of the APs 102a-102d support wireless communication in the wireless network 100. For example, the APs 102a-102d may communicate with each other or other wireless devices, such as, computers, cell phones, internet of things (IoT) devices, tablets, etc. over a wireless medium in the wireless network 100. The APs 102a-102d and other devices communicating over the wireless medium in the wireless network 100 may utilize any suitable wireless network topology and any suitable wireless communication mechanism. For example, in some embodiments, the APs 102a-102d communicate according to at least one of the IEEE 802.11 communication standards.

As discussed herein, in some embodiments, the central controller 104 and the APs 102a-102d are configured to synchronize transmission of a wireless signal by multiple access points (e.g., two or more of the APs 102a-102d) in the wireless network 100.

Figure 2:
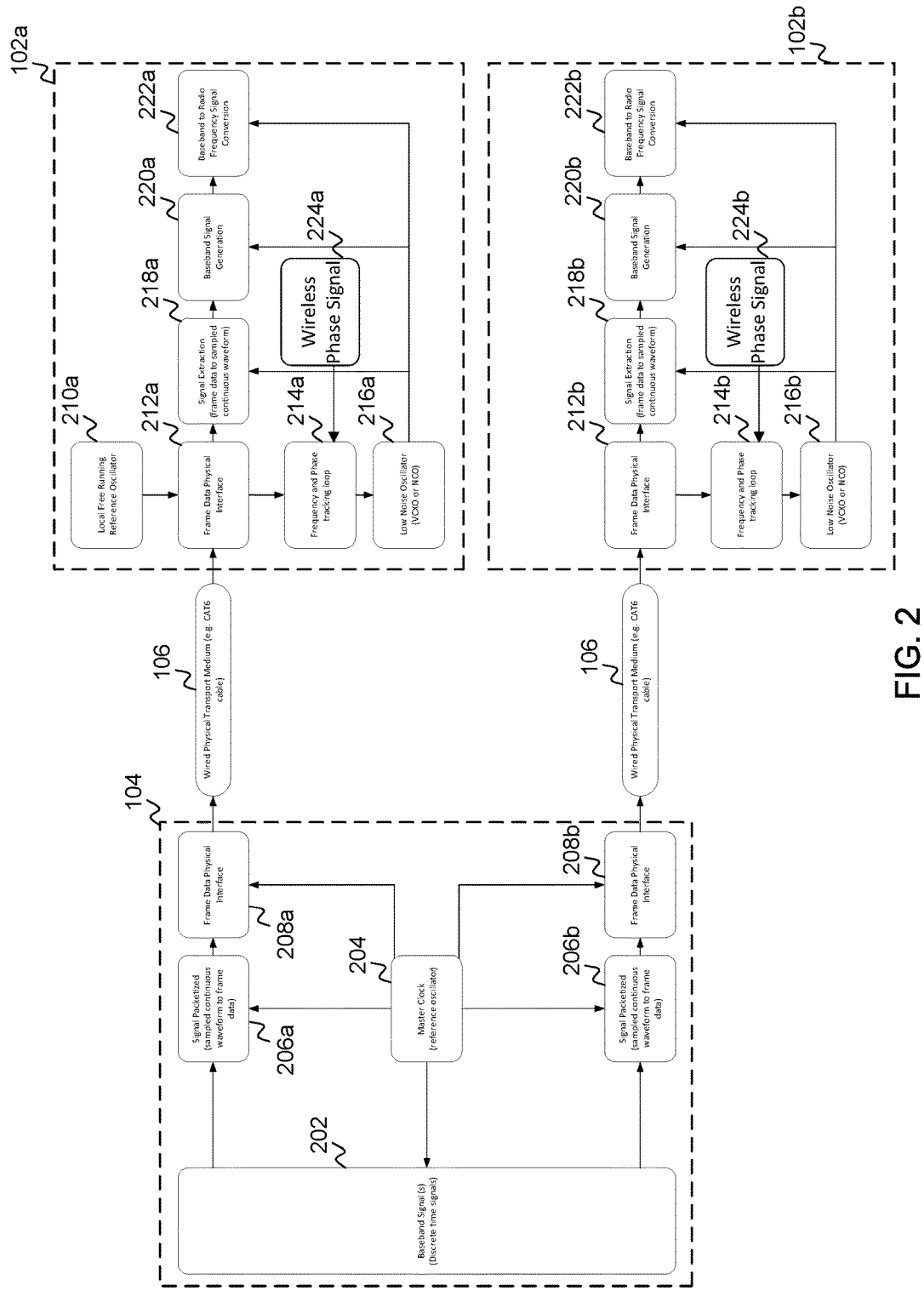
FIG. 2 is a block diagram illustrating an example of a central controller and access points of FIG. 1, according to one embodiment.

FIG. 2 is a block diagram illustrating an example of a central controller 104 and APs 102 of FIG. 1.

As shown, central controller 104 includes a baseband signal generator 202 (e.g., as part of a modem). The baseband signal generator 202 is configured to generate a baseband signal or samples of a baseband signal for wireless transmission by APs 102. In some embodiments, the baseband signal generator 202 is configured to generate discrete time samples of a continuous waveform corresponding to the baseband signal. In other embodiments, the baseband signal generator 202 is configured to generate the continuous waveform. Further, in some embodiments, the baseband signal includes inphase (I) and quadrature phase (Q) components. The baseband signal generator 202 may be configured to receive a clock signal from a master clock 204, and utilize the clock signal to generate the baseband signal or samples of the baseband signal. In some embodiments, the master clock 204 includes an oscillator configured to oscillate at a particular frequency (e.g., reference frequency). The baseband signal generator 202, in some embodiments, is configured to use the signal at the reference frequency from the master clock 204 to generate the desired signal at the desired sampling rate.

The base band signal generator 202 is configured to send the baseband signal or samples of the baseband signal to one or more signal packetizers 206. As shown, the central controller 104 includes two signal packetizers 206a and 206b, however, it should be noted that the central controller 104 may include any number of suitable signal packetizers 206.

In some embodiments, the signal packetizers 206a and 206b are configured to translate (e.g. copy) the baseband signal or samples of the baseband signal to generate a discrete signal made up of a plurality of samples corresponding to the baseband signal. In some embodiments, the baseband signal is a continuous waveform and the signal packetizers 206a and 206b receive the clock signal from the master clock 204, and utilize the clock signal to sample the baseband signal (e.g., at the reference frequency or a multiple of the reference frequency).

In some embodiments, the signal packetizers 206a and 206b are further configured to segment the samples of the discrete signals into groups of one or more samples, optionally compress or generate data representative of the samples, and packetize each of the groups of samples. For example, the signal packetizers 206a and 206b, in some embodiments, generate packets (e.g., Ethernet frames or Ethernet-like frames with a truncated header) including a header (e.g., including a source address of the central controller 104 and a destination address of an AP 102 or not including such information in a truncated header) and a payload for each group of samples, where the payload includes data representative of the group of samples. Additional information including control information and security information may be included also in the packets. The signal packetizers 206a and 206b then send the plurality of packets to a physical network interface 208a or 208b (e.g., network interface card), respectively, which transmits the packets over the wired network 106 to the APs 102a and 102b, respectively. In some embodiments, though the physical network interfaces 208a and 208b are shown as separate components, they may be the same component.

The physical network interfaces 212a and 212b of the APs 102a and 102b are each configured to receive the plurality of packets. In some embodiments, the physical network interfaces 212a and 212b each generate the samples of the discrete signal from the plurality of packets and store them in a storage (e.g., buffer, queue, FIFO buffer, etc.). In some embodiments, the physical network interfaces 212a and 212b store the samples in the storage asynchronously to the master clock 204. For example, as shown with respect to AP 102a, in some embodiments, the AP 102a includes a local free running reference oscillator 210a not synchronized to the master clock 204, and the physical network interface 212a stores samples in the storage based on the clock signal of the oscillator 210a. In some embodiments, as shown with respect to AP 102b, the physical network interface 212b stores samples in the storage based on no oscillator, or the clock signal of the oscillator 216b.

Further, as discussed, each of the physical network interfaces 212a and 212b of the APs 102a and 102b is configured to exchange clock synchronization information (e.g., synchronization signals) with the physical network interfaces 208a and 208b of the central controller 104. For example, the physical network interfaces 208a and 208b may receive a clock signal from the master clock 204 and send a synchronization signal (e.g., PHY SyncE synchronization signal) to the physical network interfaces 212a and 212b based on the clock signal. The physical network interfaces 212a and 212b, in some embodiments, are configured to generate a recovered clock (e.g., utilizing SyncE techniques) that is relatively frequency and phase locked to the clock signal of the master clock 204 based on the received synchronization signal.

The AP 102a/102b further includes a control loop 214a/214b (e.g., fractional-N PLL) and a local oscillator 216a/216b. The control loop 214a/214b locks the phase and frequency of the local oscillator 216a/216b to the phase and frequency of the recovered clock. Accordingly, the local oscillator 216a/216b acts as a local clock synchronized to the master clock 204 and generates a clock signal.

The AP 102a/102b further includes a signal extractor component 218a/218b. In some embodiments, the signal extractor component 218a/218b retrieves samples from the storage at a rate based on the clock signal from the local oscillator 216a/216b synchronized to the master clock 204 to align the samples based on the intended sampling rate (or how they were sampled for continuous waveforms) at the central controller 104.

The AP 102a/102b further includes a baseband signal generator 220a/220b that reconstructs the baseband signal corresponding to the samples of the baseband signal or the baseband signal generated by the baseband signal generator 202 based on the aligned samples from the signal extractor component 218a/218b. The baseband signal generator block may include digital signal processing, digital-to-analog conversion and analog filtering. The AP 102a/102b further includes a baseband to RF signal conversion component 222a/222b that converts the baseband (or low intermediate frequency (IF)) signal to an RF signal that the AP 102a/102b transmits wirelessly. In some embodiments, the APs 102a and 102b transmit the RF signal at a synchronized time based on the clock signal from the local oscillators 216a and 216b.

In some embodiments, the AP 102a/102b further includes a wireless phase signal component 224a/224b. In particular, the APs 102a and 102b may communicate wireless signals between each other via the wireless phase signal component 224a and 224b to determine a phase offset between the APs 102a and 102b. The wireless phase signal component 224a/224b may determine the phase offset of the AP 102a/102b based on the wireless signals exchanged between the APs 102a and 102b. The control loop 214a/214b may further utilize the phase offset to adjust the phase of the local oscillator 216a/216b, or the phase offset might be corrected in the central controller.

Figure 2A:
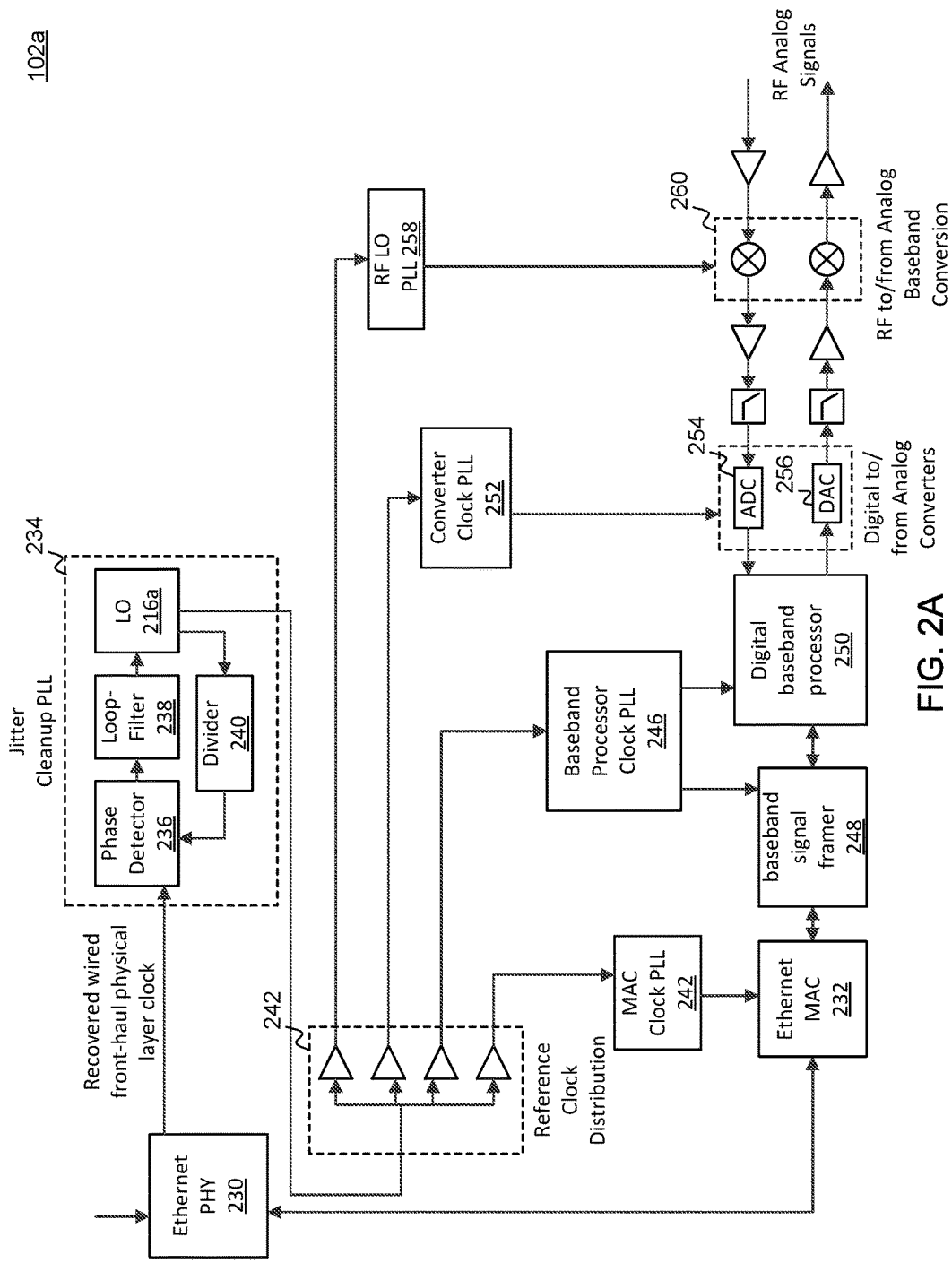
FIG. 2A is a block diagram illustrating an example of an access point of FIG. 2, according to one embodiment.

FIG. 2A is a block diagram illustrating an example of an access point 102a of FIGS. 1 and 2, according to one embodiment.

As shown, AP 102a includes an Ethernet physical layer component (PHY) (e.g., representing a PHY chip) 230 that provides analog physical access to a wired physical transport medium, such as wired network 106. Accordingly, the Ethernet PHY component 230 detects bits on the wired network 106, such as from the central controller 104. The Ethernet PHY component 230 is further coupled to an Ethernet media access control (MAC) component 232 (e.g., representing a MAC chip) that detects packet boundaries for the detected bits from the Ethernet PHY component 230 and assembled the bits into packets. In certain aspects, the Ethernet PHY component 230 and the Ethernet MAC component 232 are part of the physical network interface 212a.

The Ethernet PHY component 230 is further configured to generate a recovered clock (e.g., utilizing SyncE techniques) that is relatively frequency and phase locked to the clock signal of the master clock 204 based on the received synchronization signal. The recovered clock is input to a jitter cleanup PLL 234 configured to lock the phase and frequency of the local oscillator 216a (e.g., VCXO) to the phase and frequency of the recovered clock. For example, the jitter cleanup PLL 234 includes a phase detector 236, a loop filter 238, the local oscillator 216a, and a divider 240 configured to act as a control loop (e.g., corresponding to control loop 214a).

The clock signal of the local oscillator 216a is output to a reference clock distribution component 242, which is configured to distribute the clock signal that is relatively frequency and phase locked to the clock signal of the master clock 204 to components of the AP, as discussed herein. For example, the reference clock distribution component 242 is coupled to a MAC clock PLL 244 configured to drive the Ethernet MAC component 232. The reference clock distribution component 242 is further coupled to a baseband processor clock PLL 246 configured to drive a baseband signal framer 248 and a digital baseband processor 250. The reference clock distribution component 242 is further coupled to a converter clock PLL 252 configured to drive an ADC 254 and a DAC 256. The reference clock distribution component 242 is further coupled to a RF local oscillator (LO) PLL 258 configured to drive components 260 for RF to/from baseband conversion. Each of the MAC clock PLL 244, baseband processor clock PLL 246, converter clock PLL 252, and RF LO PLL 258 are configured to derive a clock signal from the clock signal of the local oscillator 216a that is relatively frequency and phase locked to the clock signal of the master clock 204. Accordingly, each of the components driven by the MAC clock PLL 244, baseband processor clock PLL 246, converter clock PLL 252, and RF LO PLL 258 are driven in synchronization with the master clock 204.

For example, the baseband signal framer 248 receives the packets from the Ethernet PHY component 230 and aligns the samples from the packets. The digital baseband processor 250 performs digital signal processing of the samples. The DAC 256 performs digital to analog conversion, and the ADC 254 performs analog to digital conversion.

Figure 3:
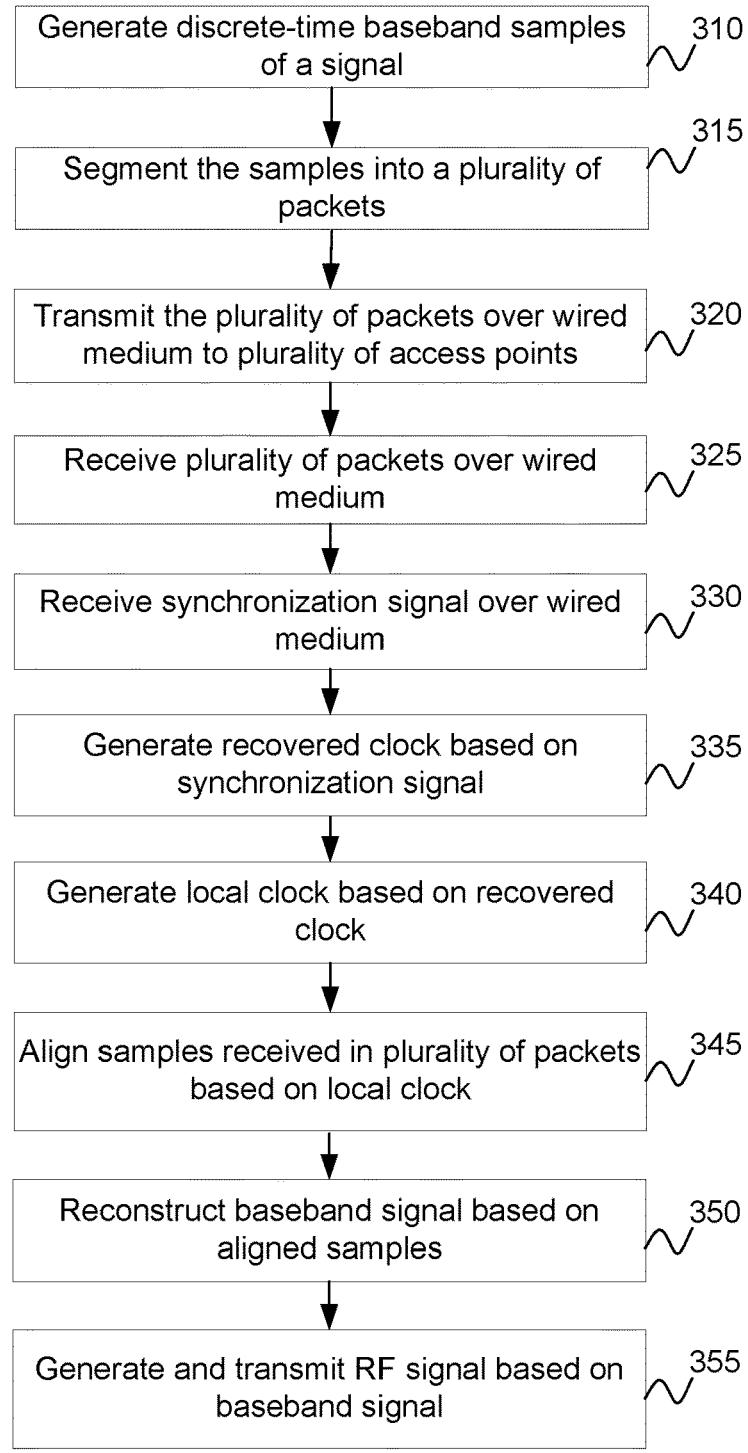
FIG. 3 illustrates a method of synchronizing wireless signal transmission between a plurality of access points, according to one embodiment.

FIG. 3 illustrates a method of synchronizing wireless signal transmission between a plurality of access points.

At 310, a central controller generates samples of a baseband signal to generate a discrete signal, the baseband signal being for synchronized transmission by each of the plurality of access points. In another embodiment, the central controller generates a continuous waveform signal and samples the continuous waveform signal to generate the discrete signal. For example, the central controller samples the baseband signal at a sample rate based on a clock signal of a master clock of the central controller.

At 315, the central controller segments the samples of the discrete signal into a plurality of packets. For example, the central controller generates packets each including a header and a payload corresponding to data representative of one or more samples of the discrete signal, and in some embodiments including other information. At 320, the central controller transmits the plurality of packets over a wired medium to a plurality of access points.

At 325, each access point of the plurality of access points receives the plurality of packets over the wired medium from the central controller. At 330, each access point receives one or more signals (e.g., a synchronization signal) from the central controller over the wired medium based on the master clock of the central controller.

At 335, each access point generates a recovered clock based on the synchronization signal. The recovered clock is phase and frequency locked (has the same phase (e.g., with a fixed offset) and frequency) as the master clock. At 340, each access point generates a local clock based on the recovered clock. For example, each access point implements a slow control loop to lock a local oscillator to the phase and frequency of the recovered signal.

At 345, each access point aligns the samples received in the plurality of packets to generate the discrete signal based on the local clock. Further, at 350, each access point reconstructs the baseband signal based on the aligned samples. At 355, each access point generates an RF signal based on the baseband signal and wirelessly transmits the RF signal. In some embodiments, the access points synchronize (in time) transmission of the RF signals based on the local clocks.

Figure 4:
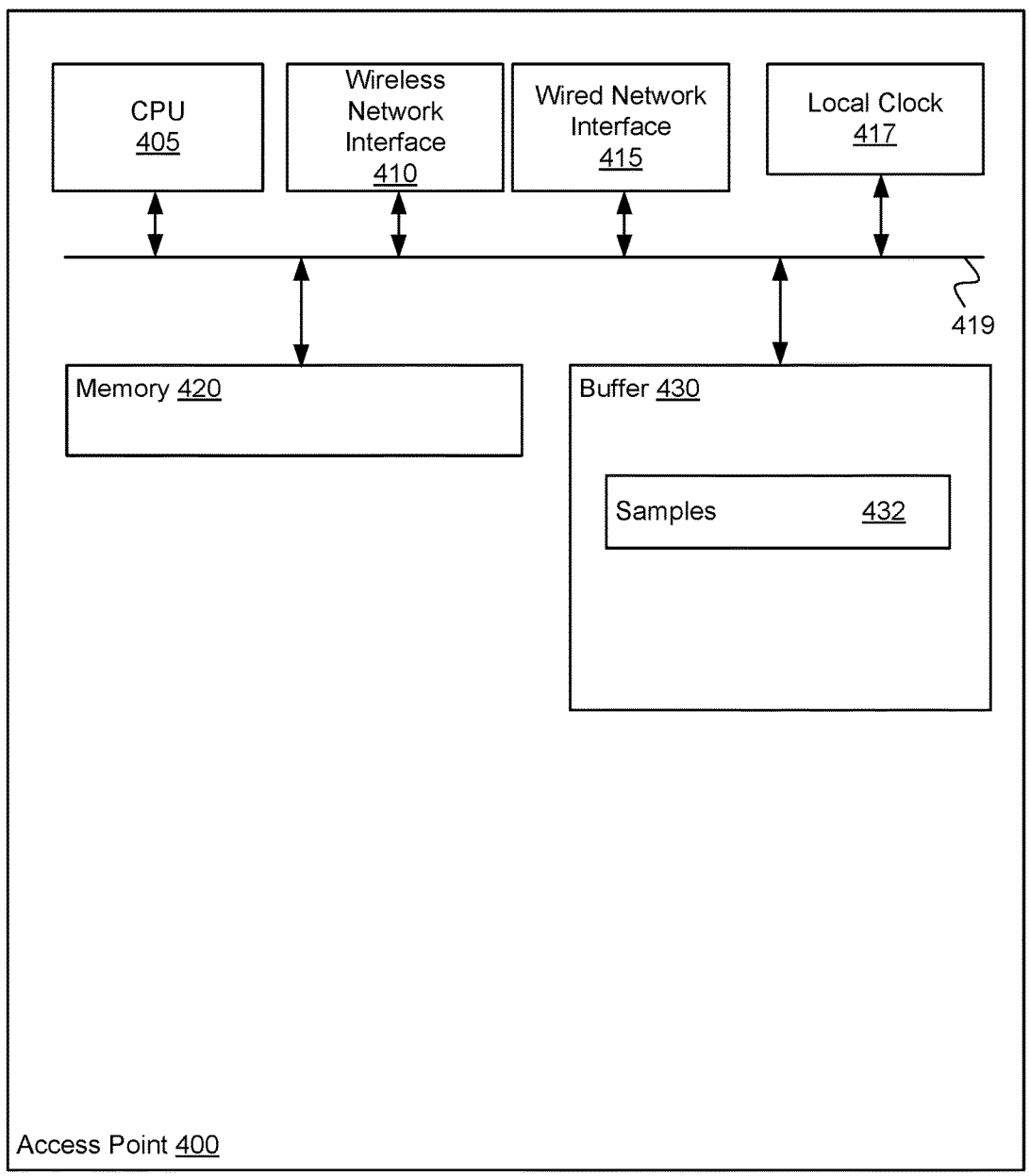
FIG. 4 illustrates an example access point configured to synchronize wireless signal transmission with one or more additional access points, according to one embodiment.

FIG. 4 illustrates an example access point 400 configured to synchronize wireless signal transmission with one or more additional access points, according to one embodiment. For example, the access point 400 may be configured to perform the blocks 325-355 of method 300. As shown, the access point 400 includes, without limitation, a central processing unit (CPU) 405, a wireless network interface 410, a wired network interface 415, a local clock 417, a memory 420, and buffer 430, each connected to a bus 419.

The CPU 405 retrieves and executes programming instructions stored in the memory 420, for example, instructions to perform or direct operation of the blocks 325-355 of method 300. The bus 419 is used to transmit programming instructions, data, and signals between the CPU 405, wireless network interface 410, wired network interface 415, local clock 417, memory 420, and buffer 430. Note, CPU 405 is included to be representative of a single CPU, multiple CPUs, a single CPU having multiple processing cores, and the like. And the memory 420 is generally included to be representative of a random access memory and/or non-volatile memory. The buffer 430 may be queue, a buffer, a FIFO queue, etc.

Figure 5:
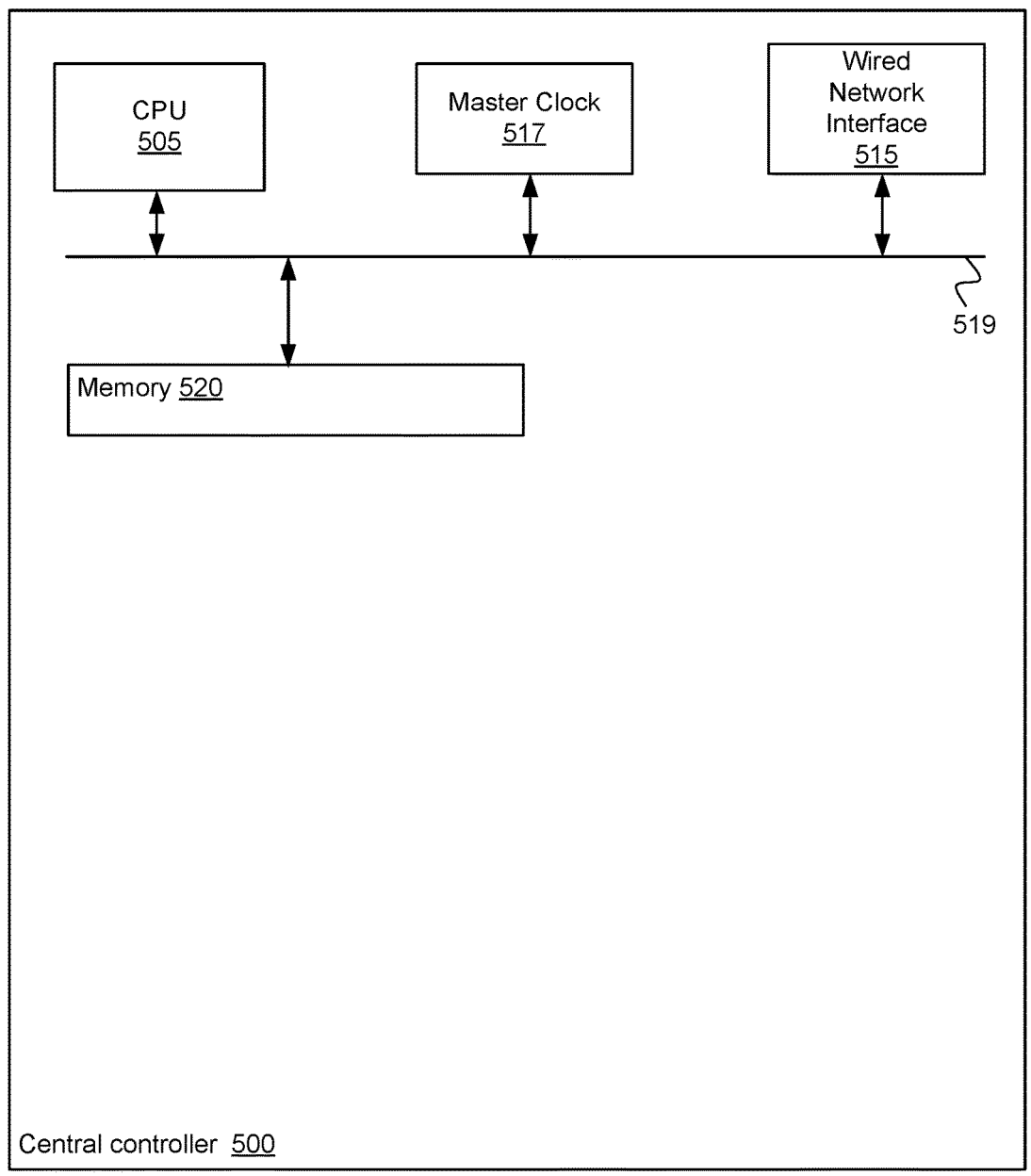
FIG. 5 illustrates an example central controller configured to synchronize wireless signal transmission for a plurality of access points, according to one embodiment.

FIG. 5 illustrates an example central controller 500 configured to synchronize wireless signal transmission for a plurality of access points, according to one embodiment. For example, the central controller 500 may be configured to perform the blocks 305-320 of method 300. As shown, the central controller 500 includes, without limitation, a central processing unit (CPU) 505, a wired network interface 515, a memory 520, and a master clock 517, each connected to a bus 519.

The CPU 505 retrieves and executes programming instructions stored in the memory 520, for example, instructions to perform or direct operation of the blocks 305-320 of method 300. The bus 519 is used to transmit programming instructions, data, and signals between the CPU 505, wired network interface 515, memory 520, and master clock 517. Note, CPU 505 is included to be representative of a single CPU, multiple CPUs, a single CPU having multiple processing cores, and the like. And the memory 520 is generally included to be representative of a random access memory and/or non-volatile memory.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of wireless communication comprising:
   receiving, at a first device, over a wired medium between the first device and a second device, a plurality of packets from the second device, each of the plurality of packets comprising data representative of a portion of a signal corresponding to a wireless medium;
   receiving, at the first device, from the second device over the wired medium a synchronization signal based on a common master clock at the second device;
   synchronizing, at the first device, a local clock of the first device to the common master clock based on the synchronization signal;
   reconstructing the signal corresponding to the wireless medium based on the plurality of packets and the synchronized local clock;
   receiving, at the first device, over the wireless medium, a second signal;
   generating, at the first device, a second plurality of packets comprising data representative of a portion of the second signal based on the synchronized local clock; and
   transmitting, by the first device to the second device, over the wired medium the second plurality of packets, wherein the second signal can be reconstructed based on the second plurality of packets and the common master clock.

2. The method of claim 1, wherein the first device comprises an endpoint, the second device comprises a common physical point, and the method further comprises transmitting, over the wireless medium, the reconstructed signal.

3. The method of claim 1, wherein the signal comprises a continuous waveform, and wherein data representative of a portion of the signal comprises at least one of samples corresponding to the continuous waveform, chips indicative of the samples, CDMA patterns indicative of the samples, OFDM frequency-domain data indicative of the samples, and OFDM data without a cyclic prefix indicative of the samples.

4. The method of claim 3, wherein the samples corresponding to the continuous waveform are generated based on the common master clock, and wherein reconstructing the signal comprises aligning the samples corresponding to the continuous waveform received in the plurality of packets based on the synchronized local clock; and further comprising using the synchronized local clock to drive a digital-to-analog converter.

5. The method of claim 1, wherein the synchronization signal comprises a physical layer signal.

6. The method of claim 1, wherein synchronizing the local clock to the common master clock comprises:
   generating a recovered clock signal based on the synchronization signal; and
   locking a phase and a frequency of a local oscillator to the recovered clock signal, wherein the locked local oscillator is used as the local clock.

7. The method of claim 6, wherein locking the phase and the frequency of the local oscillator to the recovered clock signal is performed using a slow control loop.

8. The method of claim 6, further comprising receiving a wireless signal from a third device, wherein synchronizing the local clock is further based on receiving the wireless signal.

9. The method of claim 1, wherein synchronizing the local clock to the common master clock comprises resampling a frequency of at least one of a digital to analog converter and an analog to digital converter based on the synchronization signal.

10. The method of claim 1, wherein generating the second plurality of packets further comprises using the synchronized local clock to drive an analog-to-digital converter.

11. A first device for wireless communication comprising:
an interface configured to:
- receive over a wired medium between the first device and a second device, a plurality of packets from the second device, each of the plurality of packets comprising data representative of a portion of a signal corresponding to a wireless medium;
- receive from the second device over the wired medium a synchronization signal based on a common master clock at the second device;

a control loop configured to synchronize a local clock of the first device to the common master clock based on the synchronization signal by:
- generating a recovered clock signal based on the synchronization signal, and
- locking a phase and a frequency of a local oscillator to the recovered clock signal, wherein the locked local oscillator is used as the local clock; and a processor configured to reconstruct the signal corresponding to the wireless medium based on the plurality of packets and the synchronized local clock.

12. The first device of claim 11, wherein the first device comprises an endpoint, the second device comprises a common physical point, and the first device further comprises a transmitter configured to transmit, over the wireless medium, the reconstructed signal.

13. The first device of claim 11, wherein the signal comprises a continuous waveform, and wherein data representative of a portion of the signal comprises at least one of samples corresponding to the continuous waveform, chips indicative of the samples, CDMA patterns indicative of the samples, OFDM frequency-domain data indicative of the samples, and OFDM data without a cyclic prefix indicative of the samples.

14. The first device of claim 11, further comprising a receiver configured to receive a wireless signal from a third device, wherein to synchronize the local clock is further based on receiving the wireless signal.

15. The first device of claim 11, further comprising:
- a receiver configured to receive, over the wireless medium, a second signal;
- wherein the processor is further configured to generate a second plurality of packets comprising data representative of a portion of the second signal based on the synchronized local clock; and
- wherein the interface is further configured to transmit to the second device, over the wired medium, the second plurality of packets, wherein the second signal can be reconstructed based on the second plurality of packets and the common master clock.

16. A first device for wireless communication comprising:
an interface configured to:
- receive over a wired medium between the first device and a second device, a plurality of packets from the second device, each of the plurality of packets comprising data representative of a portion of a signal corresponding to a wireless medium, wherein the signal comprises a continuous waveform, and wherein data representative of a portion of the signal comprises at least one of samples corresponding to the continuous waveform, chips indicative of the samples, CDMA patterns indicative of the samples, OFDM frequency-domain data indicative of the samples, and OFDM data without a cyclic prefix indicative of the samples;
- receive from the second device over the wired medium a synchronization signal based on a common master clock at the second device;

a control loop configured to synchronize a local clock of the first device to the common master clock based on the synchronization signal; and a processor configured to reconstruct the signal corresponding to the wireless medium based on the plurality of packets and the synchronized local clock, wherein the samples corresponding to the continuous waveform are generated based on the common master clock, and wherein to reconstruct the signal comprises to align the samples corresponding to the continuous waveform received in the plurality of packets based on the synchronized local clock; and further comprising a digital-to-analog converter driven using the synchronized local clock.

17. A first device for wireless communication comprising:
an interface configured to:
- receive over a wired medium between the first device and a second device, a plurality of packets from the second device, each of the plurality of packets comprising data representative of a portion of a signal corresponding to a wireless medium;
- receive from the second device over the wired medium a synchronization signal based on a common master clock at the second device;

a control loop configured to synchronize a local clock of the first device to the common master clock by resampling a frequency of at least one of a digital to analog converter and an analog to digital converter based on the synchronization signal; and a processor configured to reconstruct the signal corresponding to the wireless medium based on the plurality of packets and the synchronized local clock.

* * * * *

UNITED STATES PATENT AND TRADEMARK OFFICE
CERTIFICATE OF CORRECTION

| | |
|---|---|
| PATENT NO. | : 10,285,148 B2 |
| APPLICATION NO. | : 15/582024 |
| DATED | : May 7, 2019 |
| INVENTOR(S) | : Paul J. Stager et al. |

It is certified that error appears in the above-identified patent and that said Letters Patent is hereby corrected as shown below:

In the Specification

In Column 10, Lines 27-33, delete "PLL 258 are configured to derive a clock signal from the clock signal of the local oscillator 216a that is relatively frequency and phase locked to the clock signal of the master clock 204. Accordingly, each of the components driven by the MAC clock PLL 244, baseband processor clock PLL 246, converter clock PLL 252, and RF LO PLL 258 are driven in synchronization with the master clock 204." and insert the same on Column 10, Line 26 as a continuation of the same paragraph.

Signed and Sealed this
Third Day of September, 2019

Andrei Iancu
*Director of the United States Patent and Trademark Office*